United States Patent
Li et al.

(10) Patent No.: US 8,006,077 B2
(45) Date of Patent: Aug. 23, 2011

(54) THREAD MIGRATION CONTROL BASED ON PREDICTION OF MIGRATION OVERHEAD

(75) Inventors: Tong Li, Hillsboro, OR (US); Daniel Baumberger, Cornelius, OR (US); Scott Hahn, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 524 days.

(21) Appl. No.: 11/731,276

(22) Filed: Mar. 29, 2007

(65) Prior Publication Data

US 2008/0244226 A1 Oct. 2, 2008

(51) Int. Cl.
*G06F 9/30* (2006.01)

(52) U.S. Cl. ...................................... 712/229; 712/215

(58) Field of Classification Search .................. None
See application file for complete search history.

(56) References Cited

U.S. PATENT DOCUMENTS

| | | | | |
|---|---|---|---|---|
| 5,287,508 A | * | 2/1994 | Hejna et al. | 718/102 |
| 5,974,536 A | * | 10/1999 | Richardson | 712/215 |
| 6,615,316 B1 | * | 9/2003 | McKenney et al. | 711/118 |
| 2006/0150189 A1 | * | 7/2006 | Lindsley | 718/105 |

OTHER PUBLICATIONS

Foldoc, "virtual memory" article. Nov. 26, 2002, obtained via http://foldoc.org*

* cited by examiner

*Primary Examiner* — Robert Fennema
(74) *Attorney, Agent, or Firm* — Trop, Pruner & Hu, P.C.

(57) ABSTRACT

A processing system features a first processing core to operate in a first node, a second processing core to operate in a second node, and random access memory (RAM) responsive to the first and second processing cores. The processing system also features control logic to perform operations such as (a) automatically updating a resident set size (RSS) counter to correspond to the RSS for the thread on the first node in response to allocation of a page frame for a thread in the first node, and (b) using the RSS counter to predict migration overhead when determining whether the thread should be migrated from the first processing core to the second processing core. Other embodiments are described and claimed.

16 Claims, 4 Drawing Sheets

THREAD MIGRATION CONTROL BASED ON PREDICTION OF MIGRATION OVERHEAD

FIELD OF THE INVENTION

The present disclosure relates generally to the field of data processing, and more particularly to methods and related apparatus for controlling thread migration.

BACKGROUND

A multi-core or multiprocessor operating system (OS) frequently needs to decide whether or not a thread (or any unit of OS scheduling) should migrate to a different core (or processing element in general) to maintain good balance and high utilization of the system. Thread migration introduces both benefits (e.g., more balanced system load) and overhead. As the number of cores grows, migration overhead increases as well, especially in systems with non-uniform memory access (NUMA) times (e.g., due to cores connecting to different memory controllers). When the overhead of migration eventually dominates its benefits, system performance will suffer significantly. Therefore, to effectively exploit the computing power of current multi-core and future tera-scale platforms, it is important that the OS efficiently control thread migrations and minimize their overheads.

The overhead of a thread migration includes two parts: the movement overhead and the cache miss overhead. The movement overhead is the overhead of moving the thread from the run queue of one core to that of another core. The cache miss overhead includes the overhead of resolving the extra cold misses that the thread incurs after the migration and the overhead of possibly accessing remote memory if the thread migrates to a different NUMA node.

Existing operating systems use the cache hot algorithm to predict migration overhead. When the OS is about to migrate a thread from core A to core B, this algorithm considers the local caches on A to be hot if the time that has elapsed since the thread's previous execution on A is less than some threshold. If this analysis indicates that the local caches on A are hot, the cache hot algorithm predicts the thread's migration overhead to be high. This algorithm, however, is highly inaccurate, and thus often leads to poor performance. For example, if a thread gets to run only briefly and blocks for an IO request, the thread does not have sufficient time to re-warm the cache during its short execution time. The cache hot algorithm, however, would still consider this thread cache to be hot, because the thread ran very recently, even though the cache is not actually hot (i.e., even though the cache does not contain much data for the thread).

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

This disclosure describes a prediction algorithm that can be much more accurate in predicting migration overhead than the cache hot algorithm. Consequently, the OS may allow a thread to migrate only if the migration is likely to be beneficial. Thus, the disclosed prediction technique may more accurately predict migration overhead and thus enable better system performance.

Figure 1:
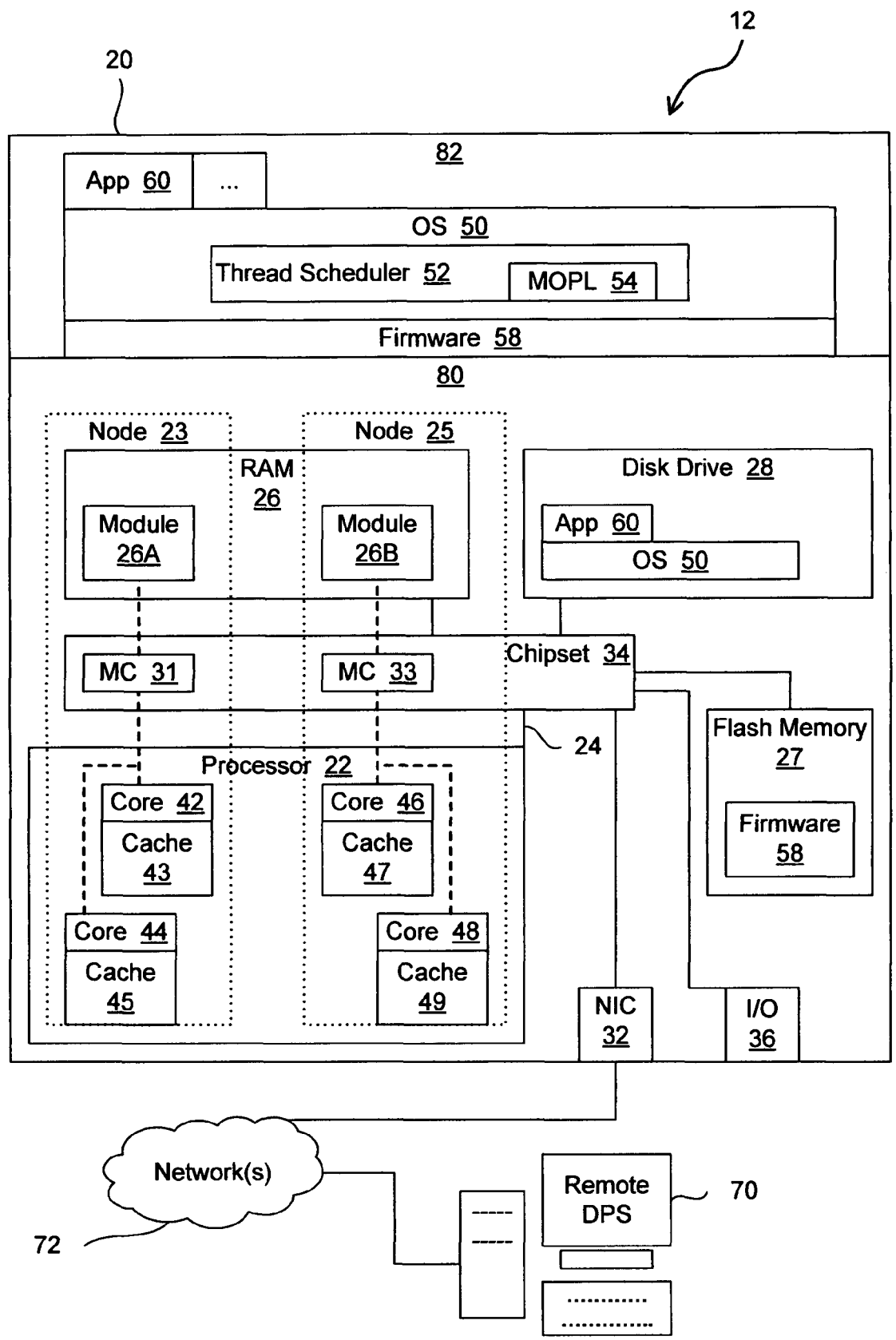
FIG. 1 is a block diagram depicting an example data processing environment.

FIG. 1 is a block diagram depicting an example data processing environment 12. Data processing environment 12 includes a local data processing system 20 that includes various hardware components 80 and software components 82.

The hardware components may include, for example, one or more processors or central processing units (CPUs) 22 communicatively coupled to various other components via one or more system buses 24 or other communication pathways or mediums. As used herein, the term "bus" includes communication pathways that may be shared by more than two devices, as well as point-to-point pathways. Processor 22 may include two or more processing units or cores, such as core 42, core 44, core 46, and core 48. Alternatively, a processing system may include a CPU with one processing unit, or multiple processors, each having at least one processing unit. The processing units may be implemented as processing cores, as Hyper-Threading (HT) technology, or as any other suitable technology for executing multiple threads simultaneously or substantially simultaneously.

Processing system 20 may be controlled, at least in part, by input from conventional input devices, such as a keyboard, a pointing device such as a mouse, etc. Processing system 20 may also respond to directives received from other processing systems or other input sources or signals. Processing system 20 may utilize one or more connections to one or more remote data processing systems 70, for example through a network interface controller (NIC) 32, a modem, or other communication ports or couplings. Processing systems may be interconnected by way of a physical and/or logical network 72, such as a local area network (LAN), a wide area network (WAN), an intranet, the Internet, etc. Communications involving network 72 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as WiMAX or wireless metropolitan area network protocols. Information on WiMAX protocols is currently available at grouper.ieee.org/groups/802/16/published.html.

Within processing system 20, processor 22 may be communicatively coupled to one or more volatile data storage devices, such as random access memory (RAM) 26, and to one or more nonvolatile data storage devices. In the example embodiment, the nonvolatile data storage devices include flash memory 27 and hard disk drive 28. In alternative embodiments, multiple nonvolatile memory devices and/or multiple disk drives may be used for nonvolatile storage. Suitable nonvolatile storage devices and/or media may include, without limitation, integrated drive electronics (IDE) and small computer system interface (SCSI) hard drives, optical storage, tapes, floppy disks, read-only memory (ROM), memory sticks, digital video disks (DVDs), biological storage, phase change memory (PCM), etc. As used herein, the term "nonvolatile storage" refers to disk drives, flash memory, and any other storage component that can retain data when the processing system is powered off. The term "nonvolatile memory" refers more specifically to memory devices (e.g., flash memory) that do not use rotating media but still can retain data when the processing system is powered off. The terms "flash memory" and "ROM" are used herein to refer broadly to nonvolatile memory devices such as erasable programmable ROM (EPROM), electrically erasable programmable ROM (EEPROM), flash ROM, etc.

Processor 22 may also be communicatively coupled to additional components, such as NIC 32, video controllers, IDE controllers, SCSI controllers, universal serial bus (USB) controllers, input/output (I/O) ports, input devices, output devices, etc. Processing system 20 may also include a chipset 34 with one or more bridges or hubs, such as a memory controller hub, an I/O controller hub, a PCI root bridge, etc., for communicatively coupling system components. Some components, such as NIC 32, for example, may be implemented as adapter cards with interfaces (e.g., a PCI connector) for communicating with a bus. Alternatively, NIC 32 and/or other devices may be implemented as embedded controllers, using components such as programmable or non-programmable logic devices or arrays, application-specific integrated circuits (ASICs), embedded computers, smart cards, etc.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio and/or video devices, and other devices for processing and/or transmitting information.

Processor 22 may also include a low level cache (e.g., an L1 cache) for each core (e.g., cache 43, cache 45, cache 47, and cache 49). Processing system 20 may also include one or more memory controllers. In the embodiment of FIG. 1, chipset 34 includes a memory controller 31 that manages memory operations between cores 42 and 44 and a subset of the system RAM, such as memory module 26A. Chipset 34 also includes another memory controller 33 that manages memory operations between cores 46 and 48 and another subset of the system RAM, such as memory module 26B. In alternative embodiments, processing systems may feature different numbers and/or combinations of cores, memory controllers, memory modules, etc.

In the embodiment of FIG. 1, cores 42 and 44, memory controller 31, and memory module 26A are referred to collectively as node 23. Similarly, cores 46 and 48, memory controller 33, and memory module 26B are referred to collectively as node 25.

For purposes of this disclosure, a "node" is a group of one or more cores and one or more memory modules that connect to the same memory controller. Within a node, every core is considered equidistant to every local memory module.

For purposes of this disclosure, the "resident set" of a thread includes the memory pages of the thread that are currently in memory (i.e., resident). The resident set of a thread on node N is the set of pages that belong to the thread's resident set and physically reside on node N.

For purposes of this disclosure, the "dominating node" of a thread is the node on which the thread's resident set size (RSS) is maximal among its RSS values on all of the nodes in the system. The maximum RSS is called the thread's dominating RSS.

An embodiment of the invention is described herein with reference to or in conjunction with data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or nonvolatile data storage. As used herein, the term "program" covers a broad range of software components and constructs, including applications, modules, drivers, routines, subprograms, methods, processes, threads, and other types of software components. Also, the term "program" can be used to refer to a complete compilation unit (i.e., a set of instructions that can be compiled independently), a collection of compilation units, or a portion of a compilation unit. Thus, the term "program" may be used to refer to any collection of instructions which, when executed by a processing system, perform a desired operation or operations.

The programs in processing system 20 may be considered components of a software environment 82. For instance, data storage device 28 and/or flash memory 27 may include various sets of instructions which, when executed, perform various operations. Such sets of instructions may be referred to in general as software.

As illustrated in FIG. 1, in the example embodiment, the programs or software components 82 may include system firmware 58, OS 50, and one or more applications 60. System firmware 58 may include boot firmware for managing the boot process, as well as runtime modules or instructions that can be executed after the OS boot code has been called. System firmware 58 may also be referred to as a basic input/output system (BIOS) 58.

In the embodiment of FIG. 1, OS 50 includes a thread scheduler 52, which includes migration overhead prediction logic (MOPL) 54. In particular, thread scheduler 52 may include control logic for method for tracking per-thread, per-node RSS. MOPL 54 may include control logic for predicting migration overhead based on the RSS data. And thread scheduler 52 may include control logic for controlling thread migration, based on the prediction.

Thread scheduler 52 may maintain two sets of data structures: a per-thread RSS counter array, and a per-page-frame owner list.

For each thread, the per-thread RSS counter array maintains an array of N RSS counters, where N is the number of nodes in the system. The ith entry of the array keeps the RSS of the thread on node i.

For each page frame, the per-page-frame owner list contains the identifiers (IDs) of all threads whose resident sets contain this page frame.

Figure 2:
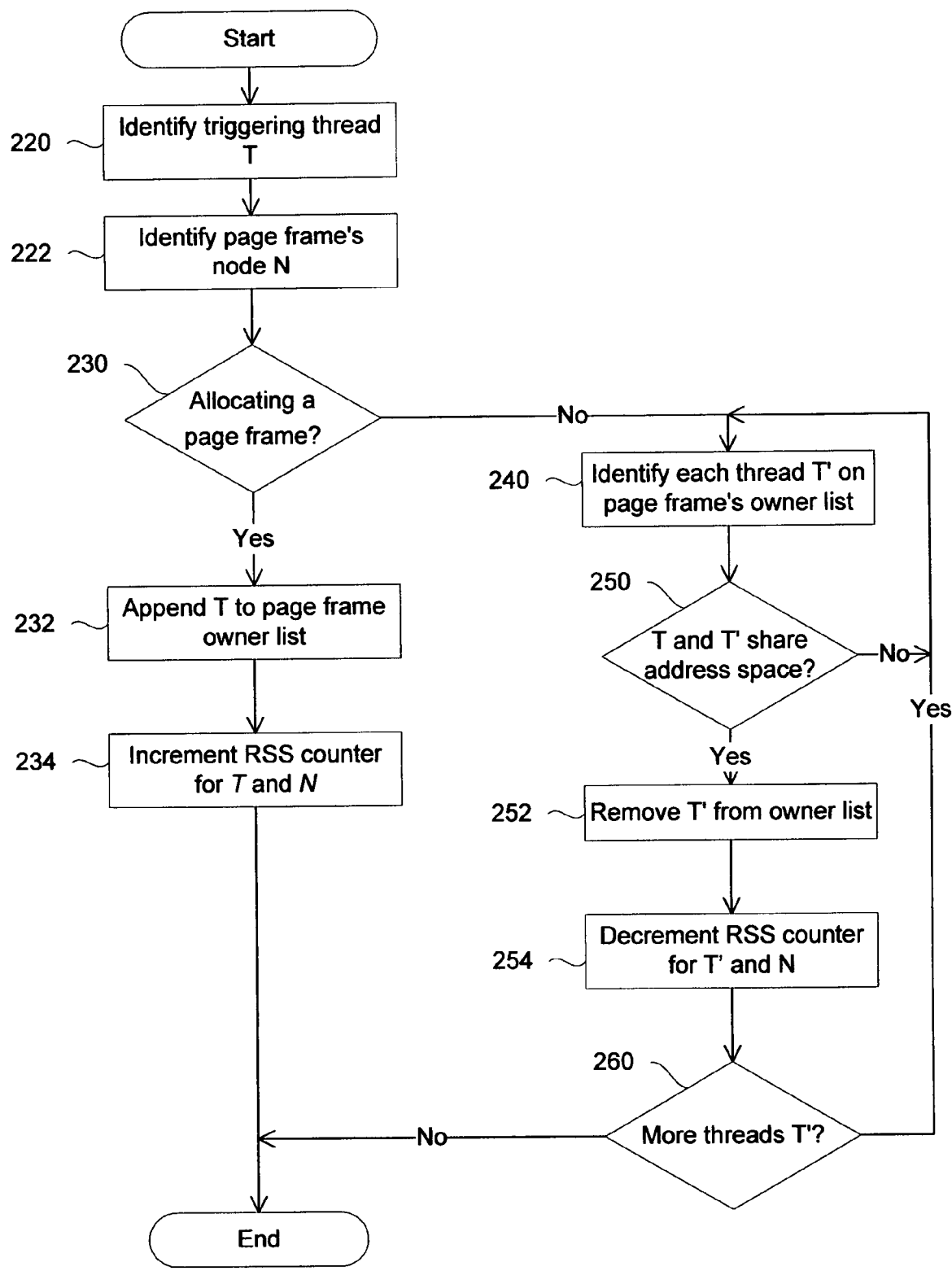
FIGS. 2-4 are flowcharts depicting various aspects of example process for controlling thread migration in the processing system of FIG. 1.
Figure 3:
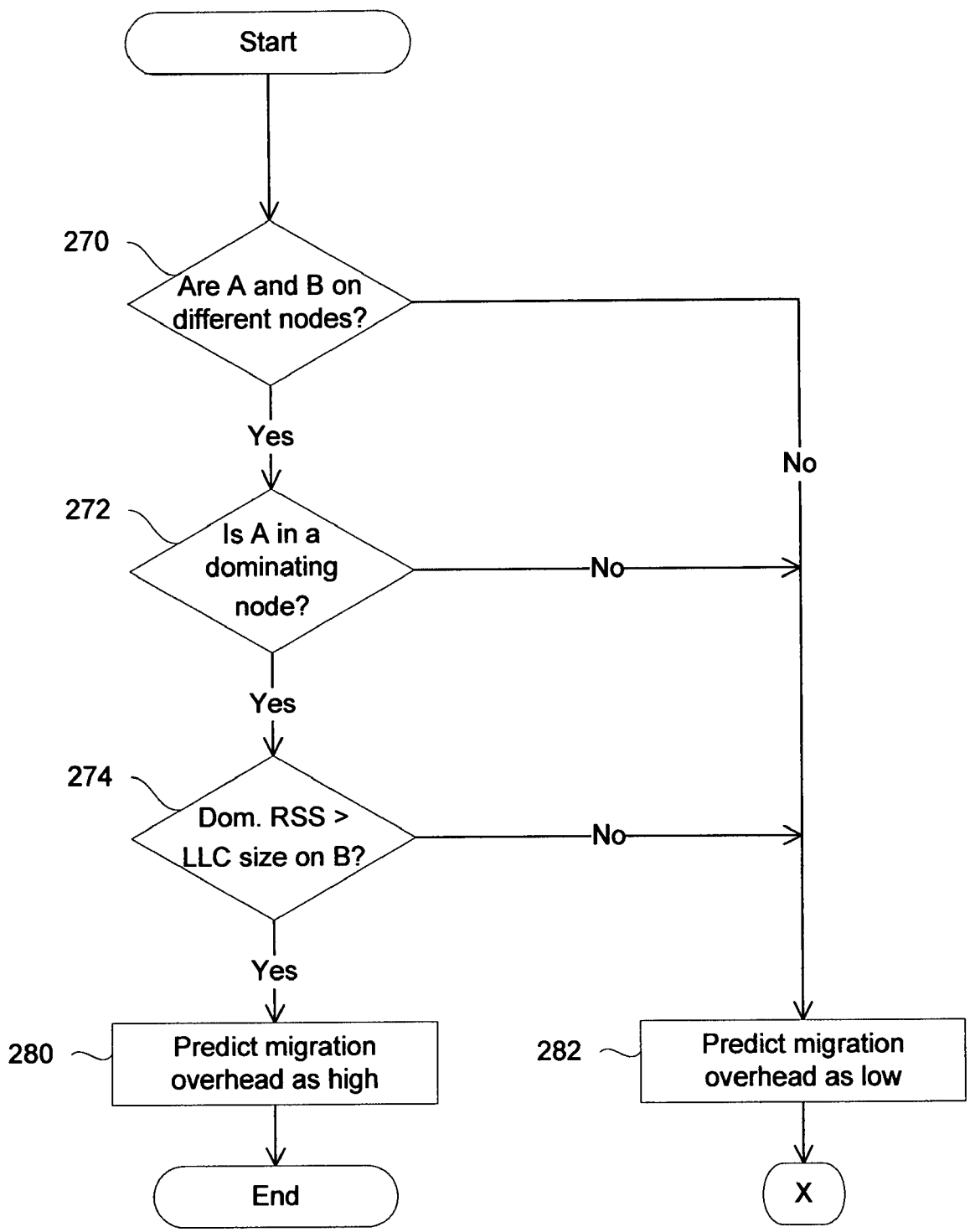
Figure 4:
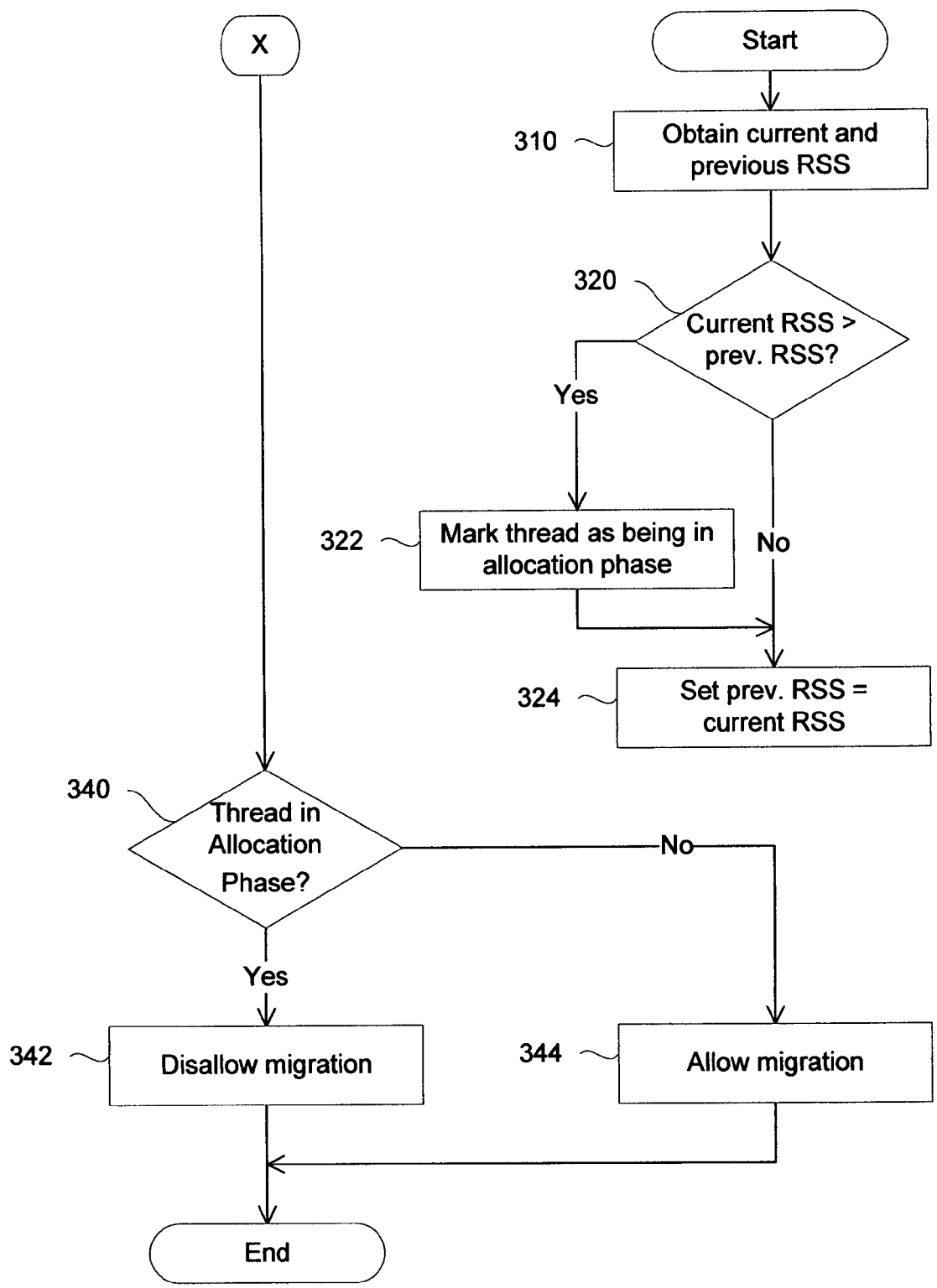

FIGS. 2-4 are flowcharts depicting various aspects of an example process for controlling thread migration in processing system 20. The process of FIG. 2 starts with OS 50 executing control logic in processing system 20 for tracking RSS per thread and per node. This control logic may be referred to as an RSS tracking module, and it may perform the illustrated operations whenever OS 50 allocates a page frame to the address space of a thread, and whenever OS 50 de-allocates a page frame from the address space of a thread.

For instance, as depicted at block 220, OS 50 may identify the thread, T, which triggered the allocation (or de-allocation). For example, if the allocation is due to a page fault, then identify the thread that caused the page fault. As shown at block 222, OS 50 may then identify the node, N, to which the page frame belongs. OS 50 may then determine whether the operation to trigger the RSS tracking module was an allocation operation, as shown at block 230.

As depicted at blocks 232 and 234, if a page frame has been allocated, OS 50 appends the ID of thread T to the page frame's owner list, and increments by one the RSS counter corresponding to thread T and node N. However, if OS 50 has de-allocated a page frame, OS 50 scans the owner list for that page frame for entries for all owning threads, T', as shown at blocks 240 and 260. For each entry, if that thread T' has already exited, OS 50 removes this entry from the owner list. If T' has not already exited, OS 50 checks whether threads T and T' belong to the same process (i.e., whether they share the same address space), as shown at block 250. If so, OS 50 removes this entry from the owner list and decrements by one the RSS counter corresponding to thread T' and node N, as shown at blocks 252 and 254.

FIG. 3 depicts an example set of operations to be performed by MOPL 54. MOPL 54 may start these operations whenever OS 50 is determining whether or not to migrate a thread from one core (e.g., core 42) to another (e.g., core 46). For instance, MOPL 54 may predict the migration overhead to be high (as shown at block 280) if all of the following conditions are true:
- (block 270) are cores 42 and 46 in different nodes?
- (block 272) is the node containing core 42 the dominating node of the thread?
- (block 274) is the dominating RSS of the thread greater than the last-level cache (LLC) size of core 46?

Otherwise, MOPL may predict the overhead to be low, as shown at block 282.

FIG. 4 depicts an example set of operations to be performed by control logic in OS 50 that controls thread migration whenever OS 50 is preparing to migrate a thread from core A (e.g., core 42) to core B (e.g., core 46). This control logic, which may be referred to as a migration controller, disallows the migration if either (a) MOPL 54 has predicted the migration overhead to be high, or (b) the thread is executing in the memory allocation phase. The migration controller may receive control whenever a timer interrupt occurs. The migration controller may then initially define the interrupted thread T to be in the non-allocation phase. As shown at block 310, OS 50 may then obtain the current and previous RSSs for thread T, aggregated over the RSS counters for all nodes. If the interrupted thread's current RSS is greater than its previous RSS, OS 50 updates the thread to be in the allocation phase, as shown at blocks 320 and 322. Otherwise, the phase remains unchanged. The migration controller then sets the thread's previous RSS to have the value of its current RSS, as shown at block 324.

In addition, if MOPL 54 has predicted overhead to be low, the process may flow from FIG. 3 to FIG. 4 via page connector X. OS 50 then determines whether thread T is in an allocation phase, as shown at block 340. If so, OS 50 prevents the migration, as shown at block 342. Otherwise, OS 50 may allow the migration, as depicted at block 344.

As has been described, thread memory usage information may be used directly to predict migration overhead. As described above, an example process may use the thread memory usage information to predict migration overhead more accurately than conventional methods, and thus it can significantly improve the performance of multiprocessor processing systems, including those with NUMA-style architectures. Accordingly, the present process may be used to avoid load balancing issues that can overburden certain parts of a system and leave other parts underutilized. Further, the present process may be used to advantage in a single-node system that supports multiple memory controllers and can behave as a NUMA system.

In light of the principles and example embodiments described and illustrated herein, it will be recognized that the described embodiments can be modified in arrangement and detail without departing from such principles. For instance, although one embodiment is described above as using a hard disk and flash memory as nonvolatile storage, alternative embodiments may use only the hard disk, only flash memory, only some other kind of nonvolatile storage, or any suitable combination of nonvolatile storage technologies.

Also, although the foregoing discussion has focused on particular embodiments, other configurations are contemplated as well. Even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. The hardware, software, or combinations of hardware and software for performing the operations of the invention may also be referred to as logic or control logic.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method for controlling migration of threads between processing cores, comprising:
   in response to allocation of a page frame in a first node for a thread, the first node including a first core, a first memory controller, and a first memory, automatically updating a resident set size (RSS) counter of a RSS counter array for the thread to correspond to a set of memory pages for the thread resident on the first node and automatically updating an owner list for the page frame to include an identifier for the thread;

determining, when preparing to migrate the thread from the first core to a second core in a second node including the second core, a second memory controller, and a second memory, using the RSS counter to predict migration overhead, and predicting migration overhead to be high if the first core is in a dominating node for the thread, the dominating node corresponding to one of a plurality of nodes for which the RSS counter for the thread has a maximal value of each of a plurality of RSS counters of the RSS counter array for the thread associated with each of the plurality of nodes, and the RSS counter for the thread is greater than a size of a last level cache (LLC) for the second core; and automatically disallowing migration of the thread from the first core to the second core in response to a prediction of high migration overhead.

2. The method according to claim 1, wherein the operation of using the RSS counter to predict migration overhead comprises:

predicting migration overhead to be low if the first core is not in the dominating node for the thread.

3. The method according to claim 2, wherein the operation of using the RSS counter to predict migration overhead further comprises:

predicting migration overhead to be low if the RSS counter for the thread on the dominating node is not greater than a size of a last level cache (LLC) for the second core.

4. The method of claim 1, further comprising allowing the thread migration based on the predicted migration overhead and if the thread is not in an allocation phase.

5. The method of claim 1, further comprising determining whether the thread should be migrated responsive to a timer interrupt.

6. The method of claim 1, further comprising in response to de-allocation of a page frame in the first node for the thread, removing the thread from the owner list for the page frame if the thread has exited.

7. The method of claim 1, further comprising maintaining a RSS counter array for each of a plurality of threads.

8. The method of claim 7, further comprising maintaining an owner list for each of a plurality of page frames.

9. A processing system, comprising:
a first processing core to operate in a first node;
a second processing core to operate in a second node;
random access memory (RAM) responsive to the first and second processing cores; and
control logic to maintain a resident set size (RSS) counter array for each of a plurality of threads to execute in the processing system, and to maintain a frame owner list for each of a plurality of page frames, the control logic operable to perform operations comprising:
in response to allocation of a page frame for a thread in the first node, automatically updating a RSS counter of the RSS counter array for the thread to correspond to a set of memory pages for the thread resident on the first node and automatically updating an owner list for the page frame to include an identifier for the thread; and
determining, when preparing to migrate the thread from the first processing core to the second processing core, using the RSS counter to predict migration overhead, including determining whether the first processing core is in a dominating node for the thread, the dominating node corresponding to one of a plurality of nodes for which the RSS counter for the thread has a maximal value of each of a plurality of RSS counters of the RSS counter array for the thread associated with each of the plurality of nodes, and if so, determining if the RSS counter for the thread on the dominating node is greater than a size of a last level cache (LLC) for the second processing core, and if so predicting the migration overhead to be high and automatically disallowing migration of the thread from the first processing core to the second processing core in response to a prediction of high migration overhead, otherwise predicting the migration overhead to be low and allowing the thread migration if the thread is not in an allocation phase.

10. The processing system of claim 9, wherein the control logic is further operable to perform operations comprising predicting migration overhead to be low if the first processing core is not in the dominating node for the thread.

11. The processing system of claim 9, wherein the control logic is further operable to perform operations comprising predicting migration overhead to be low if the RSS counter for the thread of the dominating node is not greater than a size of the LLC for the second core.

12. An apparatus, comprising:
a non-transitory machine-accessible storage medium; and
instructions in the non-transitory machine-accessible storage medium, wherein the instructions, when executed by a processing system with a first processing core in a first node and a second processing core in a second node, cause the processing system to perform operations comprising:
in response to allocation of a page frame for a thread in the first node, automatically updating a resident set size (RSS) counter of a RSS counter array for the thread to correspond to a set of memory pages for the thread resident on the first node and automatically updating an owner list for the page frame to include an identifier for the thread; and
determining, when preparing to migrate the thread from the first processing core, whether the thread should be migrated from the first processing core to the second processing core, using the RSS counter to predict migration overhead, including determining whether the first processing core is in a dominating node for the thread, the dominating node corresponding to one of a plurality of nodes for which the RSS counter for the thread has a maximal value of each of a plurality of RSS counters of the RSS counter array for the thread associated with each of the plurality of nodes, and if so, determining if the RSS counter for the thread of the dominating node is greater than a size of a last level cache (LLC) for the second processing core, and if so predicting the migration overhead to be high and automatically disallowing migration of the thread from the first processing core to the second processing core in response to a prediction of high migration overhead, otherwise predicting the migration overhead to be low and allowing the thread migration if the thread is not in an allocation phase.

13. The apparatus according to claim 12, wherein the operation of using the RSS counter to predict migration overhead comprises:

predicting migration overhead to be low if the first processing core is not in a dominating node for the thread.

14. The apparatus according to claim 12, wherein the operation of using the RSS counter to predict migration overhead comprises:

predicting migration overhead to be low if the RSS counter for the thread of the dominating node is not greater than the size of the LLC for the second processing core.

15. The apparatus of claim 12, wherein the instructions further cause the processing system to perform operations comprising predicting migration overhead to be low if the first processing core is not in the dominating node for the thread.

16. The apparatus of claim 12, wherein the instructions further cause the processing system to perform operations comprising predicting migration overhead to be low if the RSS counter for the thread of the dominating node is not greater than a size of the LLC for the second processing core.

* * * * *